(12) United States Patent
Lee et al.

(10) Patent No.: US 10,690,484 B2
(45) Date of Patent: Jun. 23, 2020

(54) DEPTH INFORMATION EXTRACTING DEVICE AND METHOD

(71) Applicant: LG INNOTEK CO., LTD., Seoul (KR)

(72) Inventors: Myung Wook Lee, Seoul (KR); Gi Seok Lee, Seoul (KR); Sung Ki Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 367 days.

(21) Appl. No.: 15/115,172

(22) PCT Filed: Jan. 28, 2015

(86) PCT No.: PCT/KR2015/000917
§ 371 (c)(1),
(2) Date: Jul. 28, 2016

(87) PCT Pub. No.: WO2015/115802
PCT Pub. Date: Aug. 6, 2015

(65) Prior Publication Data
US 2016/0349043 A1  Dec. 1, 2016

(30) Foreign Application Priority Data
Jan. 29, 2014  (KR) .......................... 10-2014-0011786

(51) Int. Cl.
*G01B 11/22*  (2006.01)
*G01B 11/25*  (2006.01)
(Continued)

(52) U.S. Cl.
CPC .......... *G01B 11/22* (2013.01); *G01B 11/2513* (2013.01); *G06T 7/521* (2017.01);
(Continued)

(58) Field of Classification Search
None
See application file for complete search history.

(56) References Cited

U.S. PATENT DOCUMENTS

2005/0007487 A1  1/2005  Miyoshi et al.
2010/0128129 A1*  5/2010  Kim .................... H04N 5/2226
                                                         348/164
(Continued)

FOREIGN PATENT DOCUMENTS

CN  102298149  *  12/2011  ............... G01C 3/00
CN  102298149 A  12/2011
(Continued)

*Primary Examiner* — Edemio Navas, Jr.
(74) *Attorney, Agent, or Firm* — Birch, Stewart, Kolasch & Birch, LLP

(57) ABSTRACT

A depth information extracting device according to one embodiment of the present invention comprises a projecting unit that discontinuously projects IR (InfraRed) light of a predetermined pattern; a camera unit that captures images; and a signal processing unit that performs depth information extraction and RGB image information extraction by using the images captured by the camera unit, wherein the signal processing unit extracts depth information by using an image received during a first time interval and extracts RGB image information by using an image received during a second time interval.

2 Claims, 3 Drawing Sheets

(51) Int. Cl.
*G06T 7/00* (2017.01)
*H04N 13/00* (2018.01)
*H04N 13/25* (2018.01)
*H04N 13/254* (2018.01)
*H04N 13/296* (2018.01)
*H04N 5/33* (2006.01)
*H04N 5/222* (2006.01)
*G06T 7/521* (2017.01)

(52) U.S. Cl.
CPC ............ *H04N 5/2226* (2013.01); *H04N 5/33* (2013.01); *H04N 13/25* (2018.05); *H04N 13/254* (2018.05); *H04N 13/296* (2018.05); *G06T 2207/10016* (2013.01); *G06T 2207/10024* (2013.01); *G06T 2207/10048* (2013.01); *G06T 2207/10152* (2013.01)

(56) References Cited

U.S. PATENT DOCUMENTS

| | | | |
|---|---|---|---|
| 2010/0265316 A1 | 10/2010 | Sali et al. | |
| 2011/0134114 A1 | 6/2011 | Rais et al. | |
| 2011/0175983 A1* | 7/2011 | Park | G03B 35/08 348/46 |
| 2011/0304842 A1* | 12/2011 | Kao | G01S 7/4918 356/5.01 |
| 2012/0182394 A1 | 7/2012 | Bae et al. | |
| 2013/0176396 A1* | 7/2013 | Cohen | H01L 27/1461 348/46 |
| 2013/0207970 A1 | 8/2013 | Shpunt et al. | |
| 2015/0022435 A1* | 1/2015 | Luebke | G06F 3/013 345/156 |
| 2015/0172564 A1* | 6/2015 | Fan | G02B 26/007 348/164 |
| 2015/0341573 A1* | 11/2015 | Matsuo | H04N 5/332 348/135 |
| 2016/0182791 A1* | 6/2016 | Lewkow | H04N 5/2258 348/262 |
| 2016/0295135 A1* | 10/2016 | Sekiguchi | H04N 5/332 |

FOREIGN PATENT DOCUMENTS

| | | |
|---|---|---|
| JP | 8-242469 A | 9/1996 |
| JP | 2003-324751 A | 11/2003 |
| JP | 2004-212385 A | 7/2004 |
| JP | 2010-35168 A | 2/2010 |
| JP | 2010-256291 A | 11/2010 |
| JP | 2012-243097 A | 12/2012 |
| KR | 10-2010-0059361 A | 6/2010 |
| KR | 10-2011-0084029 A | 7/2011 |
| KR | 10-2012-0084216 A | 7/2012 |
| KR | 10-2013-0027671 A | 3/2013 |
| WO | WO 2013/027340 A1 | 2/2013 |

* cited by examiner

DEPTH INFORMATION EXTRACTING DEVICE AND METHOD

CROSS REFERENCE TO RELATED APPLICATIONS

This application is the National Phase of PCT International Application No. PCT/KR2015/000917, filed on Jan. 28, 2015, which claims priority under 35 U.S.C. 119(a) to Patent Application No. 10-2014-0011786, filed in the Republic of Korea on Jan. 29, 2014, all of which are hereby expressly incorporated by reference into the present application.

TECHNICAL FIELD

The present disclosure relates to a device and method for extracting depth information.

BACKGROUND ART

A technology of acquiring a three-dimensional image using a capturing device is advancing. Depth information (depth map) is required for acquiring a three-dimensional image. Depth information is information that indicates a spatial distance and shows perspective information of a point with respect to another point in a two-dimensional image.

Methods of acquiring depth information include a method using a stereo camera, a time-of-flight (TOF) method, a structured light method, etc.

According to the method using a stereo camera, depth information may be acquired using a time difference between two cameras. According to the TOF method, depth information may be acquired by measuring flight time, i.e., the time taken for emitted light to be reflected. According to the structured light method, depth information may be acquired by projecting infrared (IR) structured light to a camera and interpreting light reflected from an object.

Meanwhile, as a technology to which a television (TV) is applied is advancing, a module including a depth information extracting function and a video call function may be embedded in a TV or connected to the TV. The module may include a projector that projects IR structured light, an IR camera that detects the IR structured light, and an RGB camera.

In this way, when the module including a depth information extracting function and a video call function includes both of the IR camera and the RGB camera, there is a problem of a difficulty with embedding the module in a TV because of a manufacturing cost increase, size enlargement, and structural complication.

DISCLOSURE

Technical Problem

The present disclosure is directed to providing a device and method for extracting depth information.

Technical Solution

According to an embodiment of the present disclosure, a device for extracting depth information includes a projecting unit that discontinuously projects IR (infrared) light of a predetermined pattern, a camera unit that captures images, and a signal processing unit that performs depth information extraction and RGB image information extraction using the images captured by the camera unit, wherein the signal processing unit extracts depth information using an image received during a first time interval and extracts RGB image information using an image received during a second time interval.

The projecting unit may periodically project the IR light.

The first time interval may correspond to a period in which the projecting unit projects the IR light.

The second time interval may correspond to a period in which the projecting unit does not project the IR light.

The image received during the first time interval may include a pattern of the IR light and an RGB image, and the image received during the second time interval may include an RGB image.

The camera unit may be an RGB camera that captures RGB images.

The device for extracting depth information may further include a control unit that controls the projecting unit, the camera unit, and the signal processing unit, and the control unit may control the period of projecting the IR light.

The control unit may control the period of projecting the IR light according to at least one of required depth resolution and a distance from an object.

According to an embodiment of the present disclosure, a method for extracting depth information of a device for extracting depth information includes discontinuously projecting IR (infrared) light of a predetermined pattern, capturing images, extracting depth information using an image captured during a first time interval, and extracting RGB image information using an image captured during a second time interval.

The first time interval may correspond to a period in which the IR light is projected, and the second time interval may correspond to a period in which the IR light is not projected.

The method for extracting depth information may further include adjusting the period of projecting the IR light using the depth information extracted by the extracting of the depth information.

In the adjusting, a distance from an object may be compared with a threshold value, and the period may be controlled to be shortened or extended according to a result of the comparison.

Advantageous Effects

According to an embodiment of the present disclosure, a depth information extracting function and a video call function are both performed using one camera such that manufacturing cost and the size of a device can be reduced.

MODES OF THE INVENTION

Figure 1:
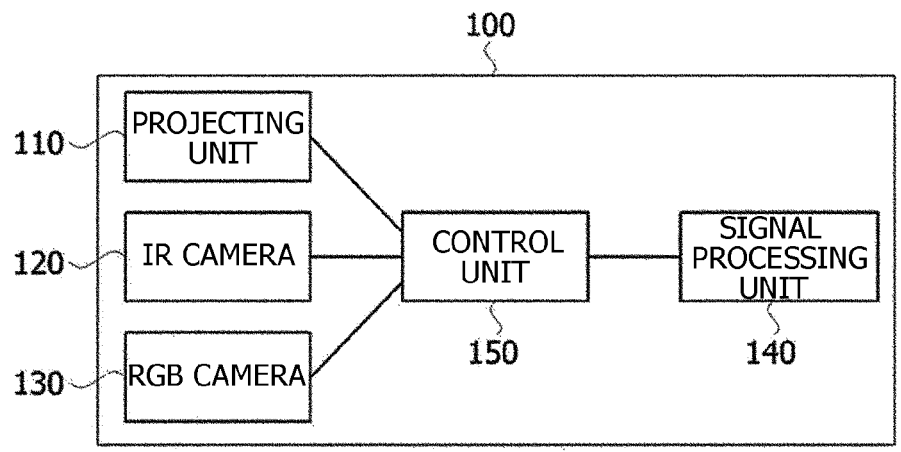
FIG. 1 is a block diagram illustrating an example of a depth information extracting device.

Since various modifications may be made to the present disclosure and the present disclosure may have various embodiments, particular embodiments are to be illustrated in the drawings and described. However, this is not for limiting the present disclosure to the particular embodiments, and all modifications, equivalents, and substitutes included within the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, the first element may also be referred to as the second element. The term and/or includes a combination of a plurality of related described items or any one item among the plurality of related described items.

When it is mentioned that a certain element is "connected" or "linked" to another element, although the certain element may be directly connected or linked to the another element, it should be understood that another element may exist therebetween. On the other hand, when it is mentioned that a certain element is "directly connected" or "directly linked" to another element, it should be understood that another element does not exist therebetween.

Terms used in the application are merely used for describing particular embodiments and are not intended to limit the present disclosure. A singular expression includes a plural expression unless clearly meaning otherwise in terms of context. In the application, terms such as "include" or "have" are for designating that features, number, steps, operations, elements, parts, or combinations thereof exist and should not be construed as precluding existence of or possibilities of adding one or more other features, numbers, steps, operations, elements, parts or combinations thereof in advance.

Unless otherwise defined, all terms, including technical or scientific terms, used herein have the same meaning as commonly understood by one of ordinary skill in the art to which the disclosure pertains. Terms, such as those defined in commonly used dictionaries, should be construed as having a meaning that is consistent with their meaning in the context of the relevant art and will not be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

FIG. 1 is a block diagram illustrating an example of a depth information extracting device.

Referring to FIG. 1, a depth information extracting device 100 includes a projecting unit 110, an IR camera 120, an RGB camera 130, a signal processing unit 140, and a control unit 150.

The projecting unit 110 projects IR light of a predetermined pattern to an object to be captured.

The IR camera 120 captures light projected from the projecting unit 110 and reflected from the object. Also, the RGB camera 130 captures an RGB image.

The signal processing unit 140 extracts depth information using an image captured by the IR camera 120 and extracts RGB image information using an image captured by the RGB camera 130. The control unit 150 controls an overall operation of the depth information extracting device 100.

In this way, when the depth information extracting device 100 separately includes the IR camera 120 and the RGB camera 130, there is a problem of a difficulty with embedding the depth information extracting device 100 in a television (TV) because manufacturing cost and the size thereof increases.

Figure 2:
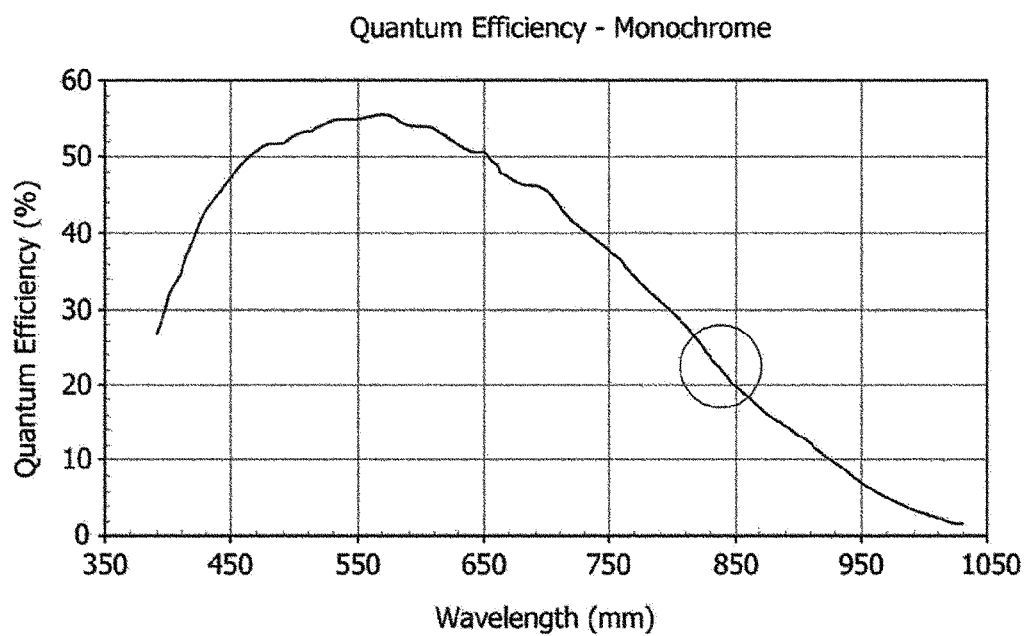
FIG. 2 illustrates quantum efficiency for each wavelength band of an RGB camera.

Meanwhile, as illustrated in FIG. 2, it can be recognized that, although quantum efficiency of a general RGB camera in a visible light band of 400 to 700 nm is 30% or higher, quantum efficiency thereof in an IR band of 800 to 850 nm is also 20% or higher. In this way, even though a general RGB camera mainly detects a wavelength band of visible light, a wavelength band of near IR light may also be detected. Accordingly, according to an embodiment of the present disclosure, an RGB camera is used to also perform a depth information extracting function.

Figure 3:
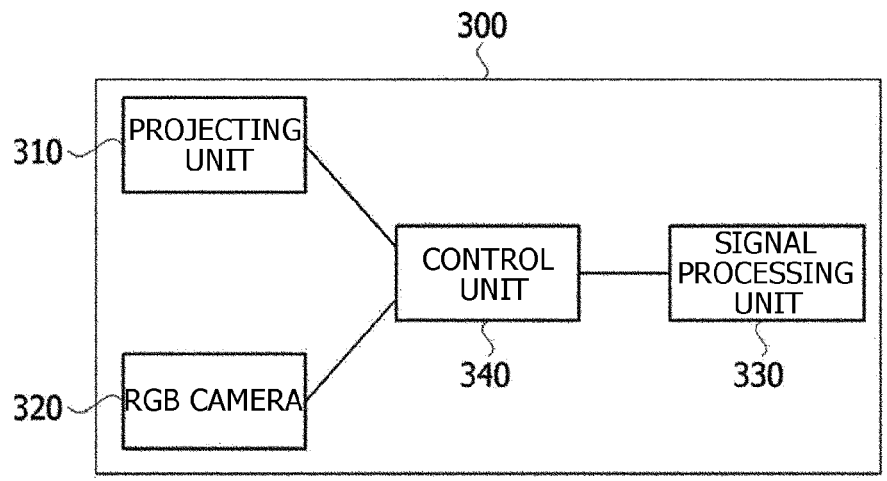
FIG. 3 is a block diagram of a depth information extracting device according to an embodiment of the present disclosure.

FIG. 3 is a block diagram of a depth information extracting device according to an embodiment of the present disclosure.

Referring to FIG. 3, a depth information extracting device 300 includes a projecting unit 310, an RGB camera 320, a signal processing unit 330, and a control unit 340.

The projecting unit 310 discontinuously projects light of a predetermined pattern. That is, the projecting unit 310 may repeat a process of projecting light for a predetermined amount of time and then not projecting light for a predetermined amount of time. Here, the light of a predetermined pattern may be IR light in a wavelength band of 800 nm or higher. For this, the projecting unit 310 may include at least one laser diode (LD) or light emitting diode (LED) that projects IR light. The projecting unit 310 may be, for example, a laser projector.

The RGB camera 320 captures an image. Although the RGB camera 320 basically captures an RGB image, the RGB camera 320 may also detect IR light projected from the projecting unit 310 and reflected by an object. A time interval during which the RGB camera 320 captures only RGB images and a time interval during which the RGB camera 320 also detects IR light together with RGB images may depend on a period in which an IR pattern is projected by the projecting unit 310. That is, the time interval during which the RGB camera 320 also detects the IR light together with the RGB images may correspond to a time interval during which the projecting unit 310 projects an IR pattern. For example, when the RGB camera 320 sends out an output of 60 fps with a resolution of 1280*1024, an output of 30 fps with a resolution of 1280*1024 may be used for RGB images, and the remaining output of 30 fps with a resolution of 1280*1024 may be used for detecting RGB images and IR light.

The signal processing unit 330 extracts depth information and RGB image information using images captured by the RGB camera 320. When an image captured by the RGB camera 320 only includes an RGB image, the signal processing unit 330 may extract RGB image information therefrom. Also, when an image captured by the RGB camera 320 includes IR light together with an RGB image, the signal processing unit 330 may extract depth information therefrom. For this, the signal processing unit 330 may recognize, in advance, a period in which the projecting unit 310 projects IR light.

The control unit 340 controls overall operations of the projecting unit 310, the RGB camera 320, and the signal processing unit 330. Particularly, the control unit 340 may control the period in which the projecting unit 310 projects IR light. In addition, the control unit 340 may transmit, to the signal processing unit 330, information on the period in which the projecting unit 310 projects IR light. For example, when depth resolution of the depth information extracted by the signal processing unit 330 is a predetermined level or lower, the control unit 340 may control the projecting unit 310 to project IR light for a shorter period. As a result of firstly extracting depth information by the signal processing unit 330, when an average distance between an object and the RGB camera 120 or a distance between a particular region of the object and the RGB camera 120 is a predetermined level or larger, the control unit may also control the projecting unit 310 to project IR light for a shorter period.

A method for extracting depth information by the depth information extracting device 300 according to an embodiment of the present disclosure is described in detail below.

Figure 4:
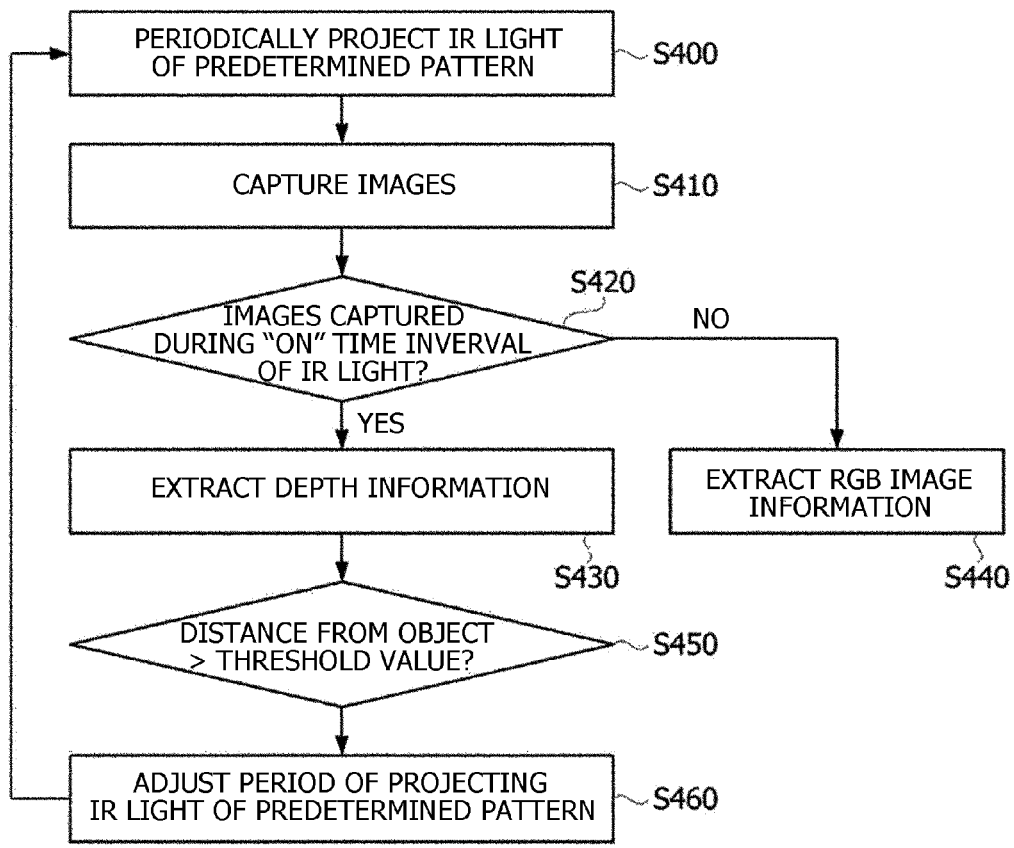
FIG. 4 is a flowchart illustrating a depth information extracting method of a depth information extracting device according to an embodiment of the present disclosure.
Figure 5:
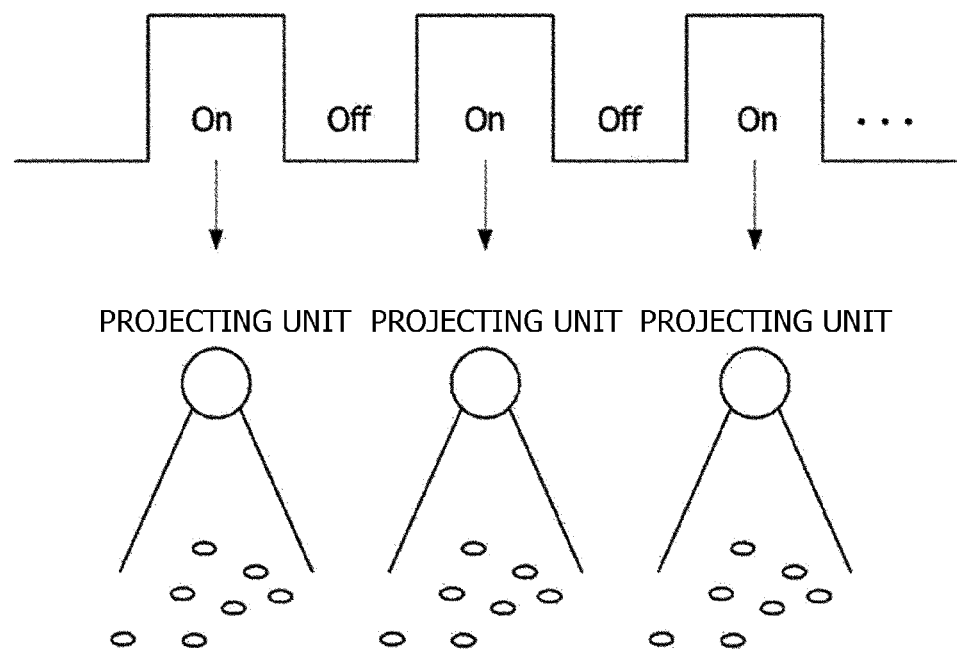
FIG. 5 illustrates a pattern in which IR light is periodically projected by a projecting unit of a depth information extracting device according to an embodiment of the present disclosure.
Figure 6:
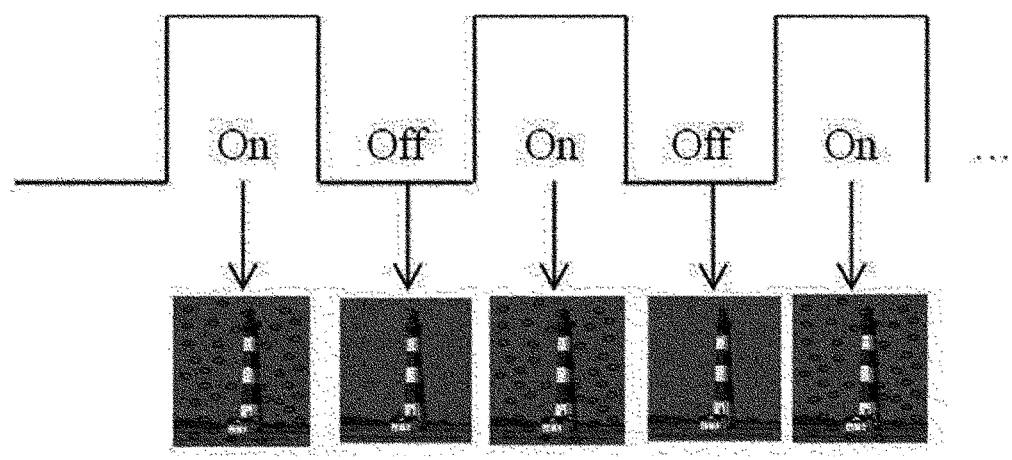
FIG. 6 illustrates images captured by the RGB camera of the depth information extracting device according to an embodiment of the present disclosure.

FIG. 4 a flowchart illustrating a depth information extracting method of a depth information extracting device according to an embodiment of the present disclosure, FIG. 5 illustrates a pattern in which IR light is periodically projected by a projecting unit of a depth information extracting device according to an embodiment of the present disclosure, and FIG. 6 illustrates images captured by the RGB camera of the depth information extracting device according to an embodiment of the present disclosure.

Referring to FIG. 4, the projecting unit 310 of the depth information extraction device 300 discontinuously projects IR light of a predetermined pattern (S400). Here, the light of a predetermined pattern may be IR light having a wavelength that is 800 nm or higher. The predetermined pattern may refer to a pattern of structured light. As in FIG. 5, the projecting unit 310 may be set to project IR light of a predetermined pattern only during the "On" periods and not to project during "Off" periods.

The RGB camera 120 captures images (S410). Even though the RGB camera 120 basically captures RGB images, IR light in a wavelength band of near IR light may also be detected. For example, as in FIG. 6, the RGB camera 320 may capture only RGB images during "Off" periods but also capture IR light together with RGB images during "On" periods.

The signal processing unit 330 uses an image captured by the projecting unit 310 during the "On" periods (S420) to extract depth information (S430). IR light of the image captured by the RGB camera 320 is light reflected from an object. This is different from a pattern of light projected by the projecting unit 310. The signal processing unit 330 may compare the pattern of IR light projected by the projecting unit 310 with the pattern of IR light captured by the RGB camera 320 to extract depth information. The depth information may be extracted by various depth information extracting algorithms using an IR structured light method. Although it is illustrated that the signal processing unit 330 is include in the depth information extracting device 300, the signal processing unit 330 may also be disposed outside the depth information extracting device 300. That is, the signal processing unit 330 outside may receive information from the capturing unit 320 through wired or wireless communication.

In addition, the signal processing unit 320 uses images captured by the projecting unit 310 during "Off" periods to extract RGB image information (S440).

Meanwhile, the control unit 340 may control a period in which the projecting unit 310 projects IR light. For example, as a result of extracting depth information by the signal processing unit 330 in Step S430, when the distance from an object is larger than a threshold value (S450), the control unit 340 may adjust the period in which the projecting unit 3310 projects IR light (S460). That is, with a larger distance from the object, a larger amount of IR light may be required to extract depth information. Accordingly, the control unit 340 may adjust the period of projecting IR light to be shorter. Alternatively, when the distance from the object is within the threshold value or quality of an RGB image is not high due to low illuminance, the control unit 340 may also adjust the period of projecting IR light to be longer.

Although the present disclosure has been described with reference to the exemplary embodiment of the present disclosure, those of ordinary skill in the art should understand that the present disclosure may be modified and changed in various ways within the scope not departing from the spirit and area of the present disclosure described in the claims below.

The invention claimed is:

1. A device for extracting depth information, the device comprising:
    a projector to discontinuously project IR (infrared) light of a predetermined pattern having a wavelength above 800 nm;
    an RGB camera to capture RGB images and to detect IR light;
    a signal processor to perform depth information extraction using the IR light captured by the camera and RGB image information extraction using the RGB images captured by the camera; and
    a controller to control the projector, the camera, and the signal processor,
    wherein the controller controls a period of projecting the IR light,
    wherein the controller controls the projector to project the IR light for a shorter period when a depth resolution of the depth information extracted by the signal processor is at a predetermined level or lower,
    wherein the controller transmits information regarding the period of projecting the IR light to the signal processor,
    wherein the signal processor only extracts the depth information using an image received during a first time interval and only extracts the RGB image information using an image received during a second time interval,
    wherein the first time interval corresponds to the period in which the projector projects the IR light and the camera detects,
    wherein the second time interval is an off period that corresponds to a whole period in which the projector does not project the IR light and the camera captures an RGB image, and wherein the device is embedded in a television.

2. A method for extracting depth information of a device for extracting depth information, the method comprising:
    discontinuously projecting, by a projector, IR (infrared) light of a predetermined pattern having a wavelength above 800 nm;
    capturing, by an RGB camera RGB images and IR light;
    extracting, by a signal processor, depth information only using IR light captured during a first time interval;

extracting, by the signal processor, RGB image information only using an RGB image captured during a second time interval; and adjusting, by a controller, a period of projecting the IR light, wherein, in the adjusting, the period of projecting the IR light is adjusted for a shorter period when a depth resolution of the depth information extracted by the signal processor is a predetermined level or lower, wherein information on the period of projecting the IR light is transmitted to the signal processor, wherein the first time interval corresponds to the period in which the IR light is projected and the camera detects, wherein the second time interval is an off period that corresponds to a whole period in which the IR light is not projected and the camera captures an RGB image, and wherein the device is embedded in a television.

* * * * *